United States Patent
Mehra et al.

(10) Patent No.: US 9,633,095 B2
(45) Date of Patent: Apr. 25, 2017

(54) EXTRACT, TRANSFORM AND LOAD (ETL) SYSTEM AND METHOD

(71) Applicant: Capillary Technologies International Pte Ltd, Singapore (SG)

(72) Inventors: Krishna Kumar Mehra, Kolkata (IN); Prasun Kumar, Bangalore (IN); Pravanjan Choudhury, Bangalore (IN); Abhilash L. Lakkur, Bangalore (IN); Sudipta Samanta, Burdwan (IN)

(73) Assignee: CAPILLARY TECHNOLOGIES INTERNATIONAL PTE LTD, Singapore (SG)

( * ) Notice: Subject to any disclaimer, the term of this patent is extended or adjusted under 35 U.S.C. 154(b) by 288 days.

(21) Appl. No.: 14/580,139

(22) Filed: Dec. 22, 2014

(65) Prior Publication Data

US 2015/0186481 A1 Jul. 2, 2015

(51) Int. Cl.
*G06F 7/00* (2006.01)
*G06F 17/30* (2006.01)

(52) U.S. Cl.
CPC .............. *G06F 17/30563* (2013.01)

(58) Field of Classification Search
CPC ................................. G06F 17/30563
See application file for complete search history.

(56) References Cited

U.S. PATENT DOCUMENTS

| 7,321,939 B1 * | 1/2008 | Porter | G06F 9/546 709/217 |
| 2014/0040182 A1 * | 2/2014 | Gilder | G06F 17/30578 707/602 |

\* cited by examiner

*Primary Examiner* — Ajith Jacob
(74) *Attorney, Agent, or Firm* — Harness, Dickey & Pierce, P.L.C.

(57) ABSTRACT

An ETL system for extracting transactional data from a plurality of source machines is provided. The ETL system includes a data query module configured to provide an interface to enable a data analyst to define an input query to extract transactional data, which is present on a plurality of source machines. The source machines form a multi-tenant system and each source machine is identified by a unique tenant identifier. The system also includes a query parsing module coupled to the data query module and configured to deconstruct the input query to create a tree structure. The tree structure comprises a plurality of distinct queries. The system further includes a data extraction module coupled to the query parsing module and configured to extract transactional data based on the distinct queries and copy the transactional data to a destination system wherein the transactional data comprises a plurality of data types.

23 Claims, 5 Drawing Sheets

┌─ 50

INSERT INTO DEST. USERS ( USER_ID, NAME ) ── 52

VALUES ⟶ DATATYPES ── 54

SELECT ( USER_ID, USER_NAME, FROM SRC USERS ) ── 56

UPDATE DEST.USERS, (SELECT USERS.ID, USERS.NAME FROM SRC.USERS) S

SET

DEST.USERS.NAME = S.NAME

WHERE

USERS.ID = S.ID

FIG. 4B

EXTRACT, TRANSFORM AND LOAD (ETL) SYSTEM AND METHOD

BACKGROUND

In present applications, the volume of data that is available and used in the organizations is rapidly increasing. The data may be used for various roles such as decision making, monitoring of various tasks, analysis of financial data, etc. Typically, those organizations that effectively and efficiently manage large volumes of data, and use the information to make business decisions, will realize a significant competitive advantage in the marketplace.

In order to manage high volumes of data in terms of improvements in price, performance, scalability, and robustness of open computing systems, support systems which are sometimes referred to as On-Line Analytical Processing (OLAP) systems have been developed. OLAP systems allow data analysts to intuitively, quickly, and flexibly manipulate operational data using familiar business terms, in order to provide analytical insight into a particular problem or line of inquiry.

OLAP applications span a variety of organizational functions. For example, OLAP systems are used in finance departments, sales analysis, marketing etc. Finance departments use OLAP for applications such as budgeting, activity-based costing (allocations), financial performance analysis, and financial modeling. Sales analysis and forecasting are two of the OLAP applications found in sales departments. Among other applications, marketing departments use OLAP for market research analysis, sales forecasting, promotions analysis, customer analysis, and market/customer segmentation. Typical manufacturing OLAP applications include production planning and defect analysis.

High volume of data is gathered in a system through multiple channels. For example, in a retail system, customer's transactional data may be collected from point of sale, ecommerce and mobile transactions. Similarly customer's behavior data may be collected via customer's social media account and customer's feedback can come from multiple online and offline channels. All these numerously different fields of data is collected and stored by an Online Transactional Processing System (OLTP) that may be potentially spread across different machines where each system may have a different representation of the data that is collected.

A requirement of a multi-tenant database system in Software as a Service (SAAS) model is to store data collected across multiple organizations in the same schematic representation under the same logical entity, like database tables. The data is identified back to their respective organizations with the help of an identifier which is also saved with the record.

An extract, transform and load (ETL) system is responsible for extracting information and/or data from a source, transforming the data and further saving it in a format conducive for further use. However, current ETL system generally do not provide a scalable framework for working in a multi-tenant federated setup with diverse source schematic representations that allows for pluggable instructions. Therefore, there is a need to provide an ETL system which allows for OLAP cubes formation in a federated and multi-tenant setup via pluggable instruction sets.

SUMMARY

The following summary is illustrative only and is not intended to be in any way limiting. In addition to the illustrative aspects, embodiments, and features described above, further aspects, embodiments, and features will become apparent by reference to the drawings and the following detailed description.

According to some examples of the present disclosure, an ETL system for extracting transactional data from a plurality of source machines hosting multi-tenant database with different schematic representations is provided. The ETL system includes a data query module configured to provide an interface to enable a data analyst to define an input query to extract transactional data. The transactional data is present on a plurality of source machines. The plurality of source machines forms a multi-tenant system and each source machine is identified by a unique tenant identifier. The system also includes a query parsing module coupled to the data query module and configured to deconstruct the input query to create a tree structure. The tree structure comprises a plurality of distinct queries. The system further includes a data extraction module coupled to the query parsing module and configured to extract transactional data based on the plurality of distinct queries and copy the transactional data to a destination system and the transactional data comprises a plurality of data types.

According to additional examples of the present disclosure, a method for extracting transactional data from a plurality of source machines hosting multi-tenant database with different schematic representations is provided. The method includes defining an input query to extract transactional data. The transactional data is present on a plurality of source machines, and wherein the transactional data comprises a plurality of data types. The method also includes parsing the input query to create a tree structure. The tree structure comprises a plurality of distinct queries. The method further includes extracting transactional data based on the plurality of distinct queries and copying the transactional data to a destination system.

BRIEF DESCRIPTION OF THE FIGURES

FIG. 4A and FIG. 4B are example input queries defined using Structured Query Language (SQL) implemented according to aspects of the present technique;

DETAILED DESCRIPTION

Figure 1:
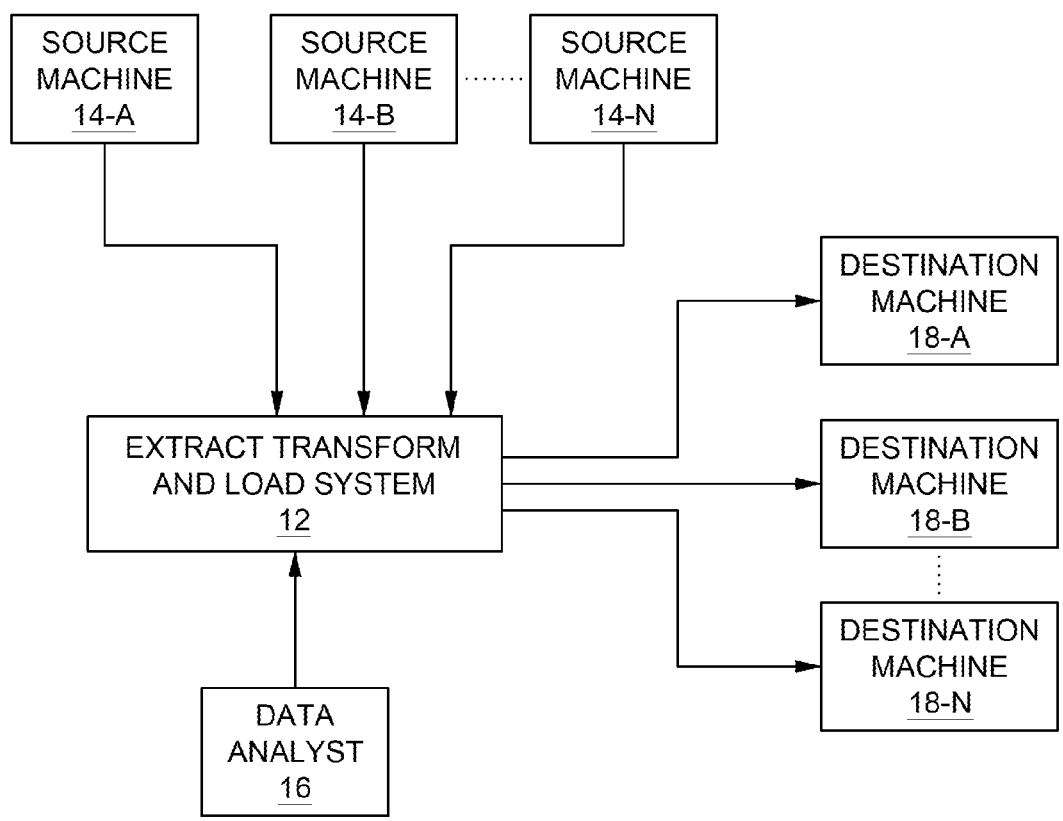
FIG. 1 is a block diagram of an example embodiment of an analytical system implemented according to aspects of the present technique.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Analytical frameworks are typically used for analysis of large amounts of data to determine various trends. For conciseness, the framework described in the following description is an ETL system serving to create OLAP cubes for an analytics system. However, the techniques described herein are applicable to any ETL system that is configured to extract data, transform data to a desired format and load the data to a desired destination.

The ETL system described herein is adapted for OLAP cube formation in a federated setup. In general, an OLAP cube is a set of fact tables where every fact table includes multiple dimensions and key performance indicator (KPI's). The key performance indicator (KPI) is a type of performance measurement. An organization may use KPI's to evaluate its success, or to evaluate the success of a particular activity in which it is engaged. A dimension refers to a discrete variable which can take only a limited set of values, like profession, age-group etc. The KPI is more of a numerical value like transaction amount, number of views etc. In the system described herein, an OLAP cube is formed for every organization (tenant) which includes multiple fact tables, containing dimensions and KPI's each in their own column, supporting, but not limited to, sales, customer, product and campaigns level analysis.

The ETL system is adapted to operate in a multitenant source database setup. In general, multi-tenancy refers to a principle in software architecture where a single instance of software runs on a server, serving multiple client-organizations generally referred as tenants. In a multitenant database architecture, a schema is designed to partition its data and configuration by an organization identifier, and each client-organization works with the data indexed with its own identifier.

In general, ETL systems enable various stake holders such as data analysts, managers, and executives to gain insight into data through fast, consistent, interactive access to a wide variety of possible views of information.

FIG. 1 is a block diagram of an example embodiment of an ETL system. The data analysis system 10 includes the analytical system 12, one or more source machines 14-A through 14-N, a data analyst 16 and one or more destination machines 18-A through 18-N. Each component is described in further detail below.

Source systems 14-A through 14-N are general databases that contain various types of data. In one embodiment, the source systems have a replication link with a primary server and maintain current data. For example, the source machines may comprise a loyalty engine modules, voucher engine modules, etc. that are configured to track transactional data for multiple consumers of a specific financial enterprise. It may be noted that the transactional data may be of various data types such as string data, alphanumeric data, and the like.

For example, the loyalty engine module may run on multiple programs across regions and countries with customized business rules and customized catalogues in multiple languages. The loyalty engine enables one to capture, track and profile in-depth information about a customer's best performers across multiple transactions and touch points. The loyalty engine may also provide a comprehensive insight into valuable information that may help customer to build real one-to-one relationships.

Similarly, the voucher engine module may generate unique random (coupon) numbers (numeric, alphabetical and alpha numeric) that can be distributed to customers on purchase of products or services. It may be noted that while the loyalty engine module can have its separate database, the voucher engine can have its own separate machine.

Destination machines 18-A through 18-N are separate machines which maintain data for multiple tenants. For example, in a multitenant environment, software runs on a server, serving multiple client-organizations (tenants). For example, one or more tenants may reside in one or more destination machines 18-A through 18-N. The tenants are logically separated in their own database.

The data analyst 16 may send a query to the respective organization. For example, the destination machine 18-A may be used by a manager of an organization that typically examines financial data by scenarios (actual vs. budget, for example), sales data by product, geography, channel, and time.

As described above, the analytical framework used as an example is an ETL system. The ETL system 12 is configured to interact with one or more source machines 14-A through 14-N. The ETL system 12 is further configured to extract transactional data and store the extracted data on one or more destination machines 18-A through 18-N.

In one embodiment, the ETL system 12 is a structured query language (SQL) based query framework. The SQL based framework allows users such as data analysts to write standard SQL queries to extract data from a source location to a destination location.

In one embodiment, the transactional data is present in one or more tables and may reside on one or more source machines 14-A through 14-N. The ETL system 12 extracts, transforms and loads the desired transactional data to the destination machines specified in a query. The ETL system is described in further detail below.

Figure 2:
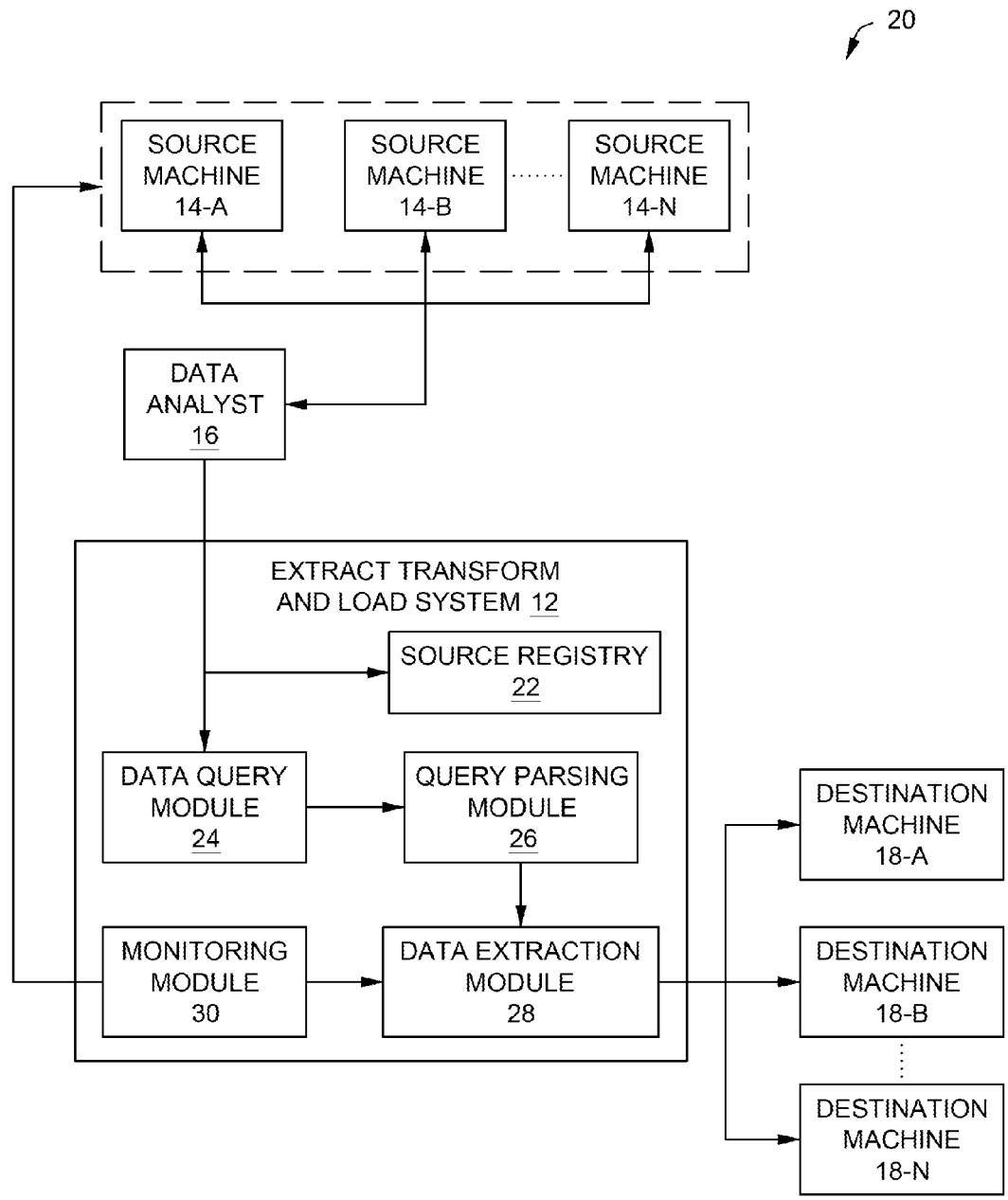
FIG. 2 is a block diagram of an example embodiment of an extract, transform and load (ETL) system implemented according to aspects of the present technique.

FIG. 2 is a block diagram of an example embodiment of an extract, transform and load (ETL) system implemented according to aspects of the present technique. In the illustrated embodiment, the ETL system 12 is implemented in a multi-tenant environment for serving multiple client-organizations. The ETL system 12 includes a source registry 22, a data query module 24, a query parsing module 26, a data extraction module 28, and a monitoring module 30. Each component is described in further detail below.

The ETL system 12 enables users such as data analyst 16 to define query in order to extract, transform and load selected transactional data from one or more source locations to a desired destination location. In one embodiment, the data resides in one or more source machines 14-A through 14-N. In one embodiment, the queries are defined in structured query language (SQL). SQL is a programming language designed for managing data held in a relational database management system. This ETL system 12 facilitates the data analyst 16 to define the SQL queries as if the relational tables are present on a single source machine.

The source registry 22 stores an initial set of identifiers corresponding to one or more source machines 14-A through 14-N. It may be noted that, the data analyst 16 may include additional identifiers to the source registry that may correspond to another set of source machines (not shown) when desired.

In one embodiment, the data query module 24 enables the data analyst 16 to define an input query to extract data from one or more source machines 14-A through 14-N. Examples of data include transactional data, geographic data, data related to specific surveys, and the like. For conciseness, transactional data is used for to describe the operation of the ETL system. Transactional data can be financial, logistical or work-related involving everything from a purchase order to shipping status to employee hours worked to insurance costs and claims. As a part of transactional records, transactional data is grouped with associated master data and reference data. Transactional data records a time and relevant reference data needed for a particular transaction record.

The data query module 24 also enables the query to be pluggable in the whole ETL process. This allows the separation of the extraction and transformation logic to be embedded completely in the query. This further allows the ETL framework to support any transformation like summarization, denormalization, and computation which a normal query (for example, SQL) system may support.

Query parsing module 26 is configured to receive the input query and fragment the query into the different segments thereby forming a tree structure. The query parsing module 26 uses the fragmented query to identify the source database and target database and separates the extraction and insertion/update query. In a further embodiment, the fragmented query is modified and optimized for further execution. The modified queries are then executed on different servers. The fragmented queries include one or more distinct queries which correspond to one or more source machine 14-A through 14-N.

Data extraction module 28 is configured to extract data on the different source machines based on the tree structure generated by the query parsing module. In one embodiment, the data extraction module 28 is used to collate and merge the data on one or more destination machine 18-A through 18-N. Further, the data extraction module 28 copies the transactional data to one or more intermediate systems. For example, the transactional data is copied by creating one or more tables based on the data types. The transactional data is then sorted into respective tables. The data extraction module 28 then combines the tables to form a final table. The final table is copied to one or more destination machine 18-A through 18-N as specified by the data analyst.

In one embodiment, the monitoring module 30 is configured to periodically monitor one or more source machine 14-A through 14-N. In addition, the monitoring module 30 also identifies the incremental transaction data from one or more source machine 14-A through 14-N. The monitoring module 30 is also responsible to trigger an alert to the data extraction module 28 to extract the incremental transaction data from one or more source machine 14-A through 14-N.

In one embodiment, SyncProcess abstraction is implemented to provide ways to define methods to extract differential data. The delta of data may be detected using several techniques, two of which are described herein. In a first mechanism, the latest data is selected based on a given date. If the source data is tagged with a field representing the last date on which the data was updated (or inserted), then the information is used as latest data. In second mechanism, the latest data is selected having an identifier that is most recent than the newest identifier originated in the previous run. In case of a multi-tenant source database, the system saves different dates and identifiers for different organization to execute the incremental updates correctly.

The manner in which the transactional data is extracted is described in further detail below.

Figure 3:
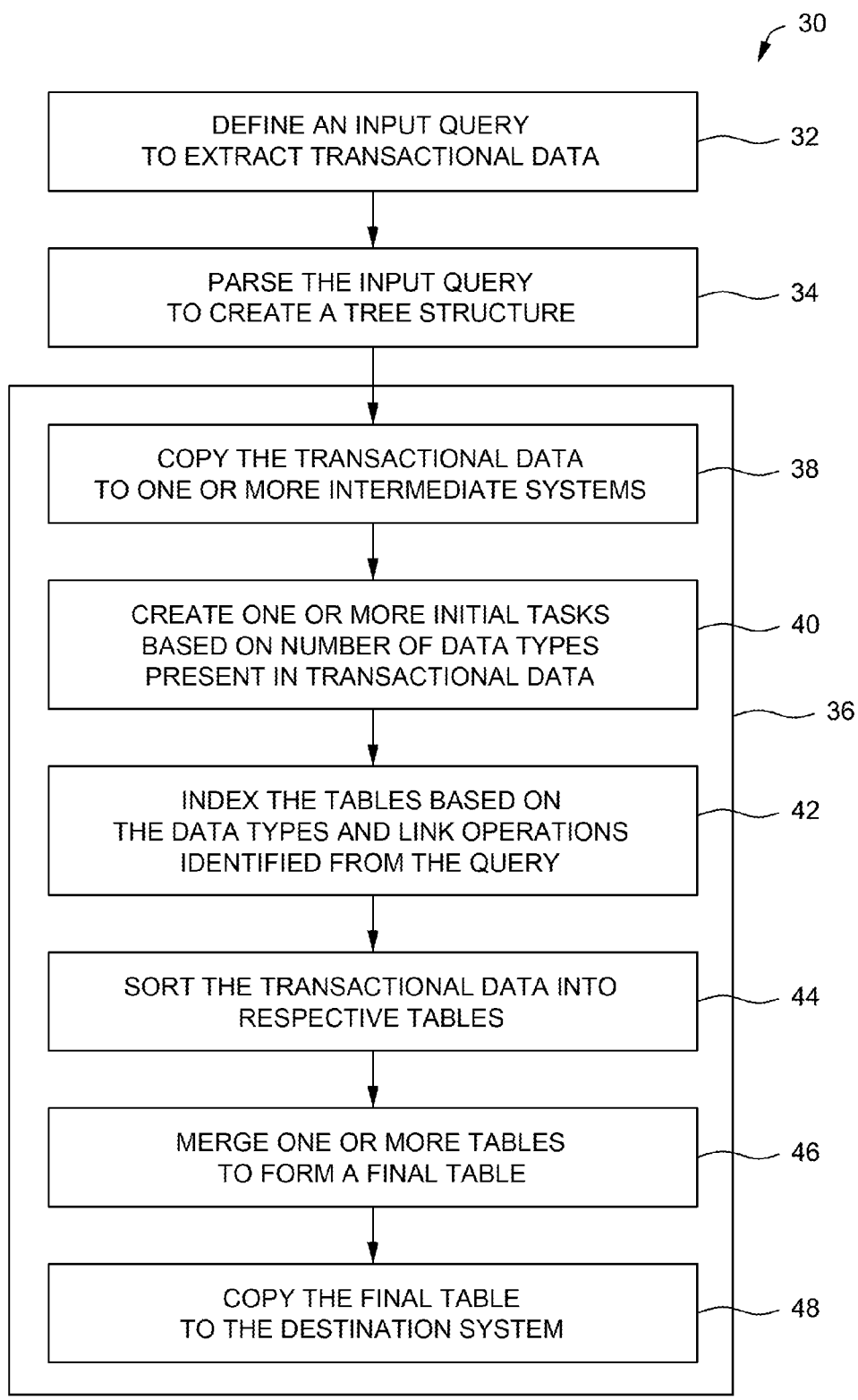
FIG. 3 is an illustration of an example process for extracting data from one or more source machines implemented according to aspects of the present technique.

FIG. 3 is a flow chart illustrating one method by which transactional data is extracted, transformed and loaded according to aspects of the present techniques. In particular, the process 30 is used for extracting transactional data by an ETL system. Each step is described in further detail below.

At step 32, an input query is defined to extract the transactional data. In one embodiment, the transactional data is present on one or more source machines and comprise one or more data types. The source machines 14-A through 14-N form a multi-tenant system and each source machine is identified by a unique tenant identifier. In a specific embodiment, the input query is defined using the structured query language.

At step 34, the input query is parsed to create a tree structure. In one embodiment, the tree structure comprises one or more distinct queries or sub-queries. In a further embodiment, each sub-query corresponds to a specific data type.

At step 36, the transactional data is extracted based on the sub-queries. The stages involved in extraction of transactional data are described in steps 38-46. At step 38, the transactional data is copied on to one or more intermediate systems. The intermediate systems may be selected from destinations systems 18-A through 18-N.

At step 40, one or more initial tables are created based on a number of data types present in the transactional data. At step 42, the tables are indexed based on the data types and link operations identified from the query. At step 44, the transactional data is sort into respective tables. At step 46, one or more tables are merged to form a final table. At step 48, the final table is copied to the destination system.

FIG. 4A and FIG. 4B are example input queries defined using Structured Query Language (SQL) implemented according to aspects of the present technique.

FIG. 4A describes an example input query 50 defined using SQL. The input query includes three parts 52, 54 and 56. The first part 52 describes the insert portion. For example, the insert portion may be DEST. USERS. The second part 54 describes the values which define the data types and the third part 56 refers to the select portion. For example, the select portion may be USER_ID, USER_NAME, FROM SRC USERS as shown in FIG. 4A.

In the above example, the insert portion of a query instructs the system to insert one row into users table of destination database with a user identification and a user name. The select portion of the query instructs the system to source the user identification and user name from the source database users table.

FIG. 4B describes the example on the update query 60. The update portion of the query instructs the system to update a user table of a destination database where the destination table identification matches the source table identification. The select portion of the query defining the source which is to be chosen from user table in the source database and the columns to be chosen is identification and name. The equality in the where clause of the update query is being inferred by the system as an opportunity to index the identification column in the initial table so that the processing of the system is optimized.

Figure 5:
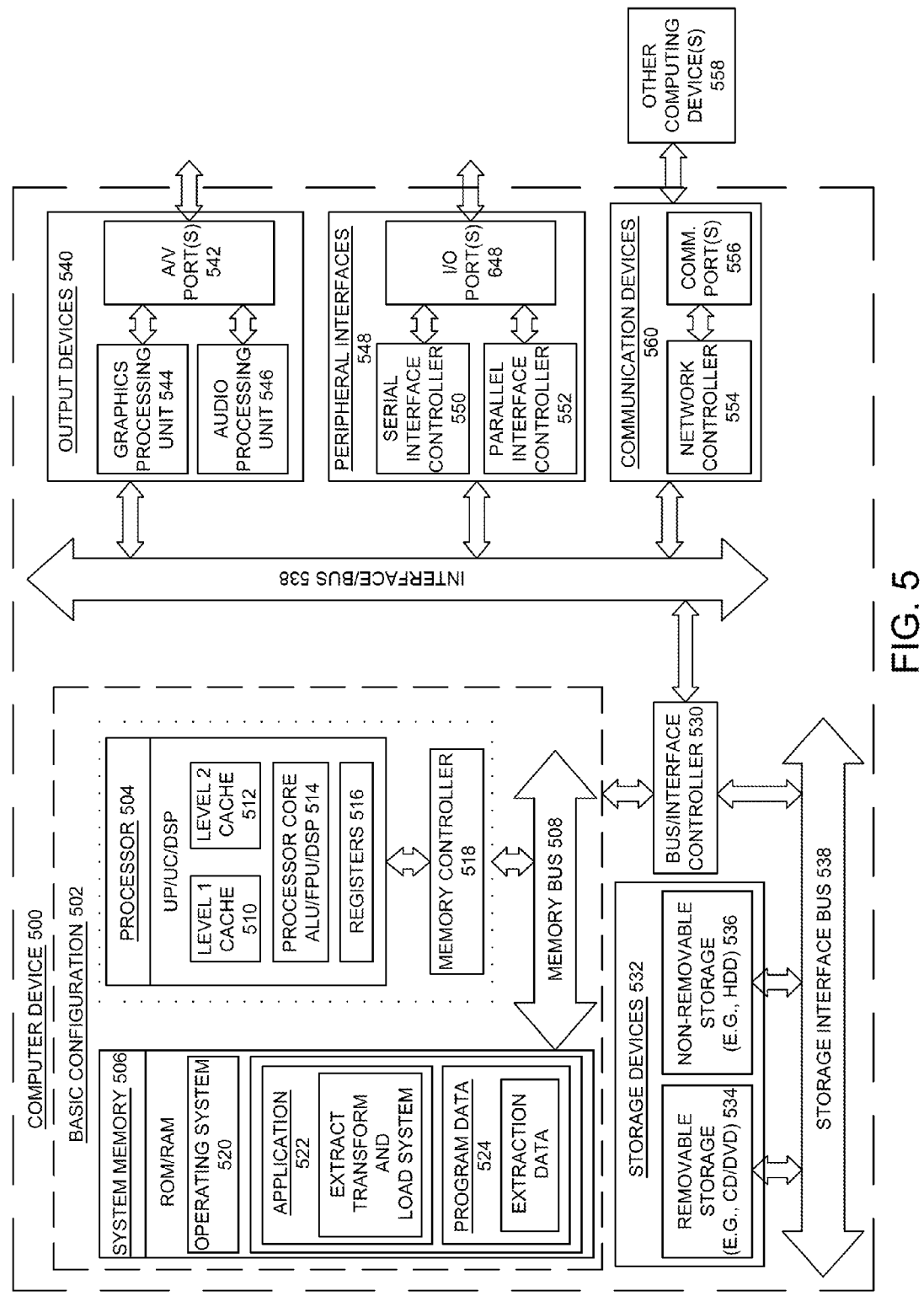
FIG. 5 is a block diagram illustrating an example computing device that is arranged for extracting data from one or more source machine and copying the extracted data to one or more destinations systems.

FIG. 5 is a block diagram illustrating an example computing device that is arranged for extracting data from one or more source machine and copying the extracted data to one or more destinations systems with at least some embodiments of the present disclosure. In a very basic configuration 502, the computing device 500 typically includes one or more processors 504 and a system memory 505. A memory bus 508 may be used for communicating between processor 504 and system memory 506. The processor 504 includes a multi-core processor.

Depending on the desired configuration, processor 504 may be of any type including but not limited to a microprocessor (W), a microcontroller (μC), a digital signal processor (DSP), or any combination thereof. Processor 504 may include one more levels of caching, such as a level one cache 510 and a level two cache 512, two or more processor cores 514, and registers 516. An example processor core 514 may include an arithmetic logic unit (ALU), a floating point unit (FPU), a digital signal processor core (DSP Core), or any combination thereof. An example memory controller 518 may also be used with processor 504, or in some implementations memory controller 518 may be an internal part of processor 504. The processor 504 may include a location prediction module such as described above to facilitate prediction a location of a given memory address based upon a memory address distribution table of memory addresses stored by the on-chip caches of one or more of the processor cores 514.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524. In some embodiments, application 522 may be arranged to operate with program data 524 on operating system 520. This described basic configuration 502 is illustrated in FIG. 5 by those components within the inner dashed line. Application 522 may include an extract, transform and load system (ETL) for extracting data from one or more source machines and copy the data to one or more destination machines. Program data 524 may include the extraction data. For example, the extraction data may comprise the transactional data. In one embodiment, transactional data may be the information that can be updated at random intervals with an expiration constraint, which is driven by data inputs and outputs of the record.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof.

Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 545) to basic configuration 502 via bus/interface controller 530. Example output devices 542 include a graphics processing unit 548 and an audio processing unit 550, which may be configured to communicate to various external devices such as a display or speakers via one or more A/V ports 552.

Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

The techniques described herein have several advantages including the capability to add and/or remove one or more source machines or destination machines easily. The system further allows each migration task to execute independently and conforms to a common interface. The system also allows for parallel or sequential execution of queries. This modular approach also extends to detection of schema modifications. Further, the changes in individual data locations, such as tables are automatically detected at run time and only such tables are recreated on the destination with the new schema. In addition, the system further allows the migrating of the incremental changes in the data.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An extract, transform and load (ETL) system for extracting transactional data from a plurality of source machines, the ETL system comprising:
   a data query module configured to provide an interface to enable a data analyst to define an input query to extract transactional data, wherein the transactional data is present on a plurality of source machines, and wherein the plurality of source machines form a multi-tenant system and each source machine is identified by a unique tenant identifier;
   a query parsing module coupled to the data query module and configured to deconstruct the input query to create a tree structure, wherein the tree structure comprises a plurality of distinct queries; and
   a data extraction module coupled to the query parsing module and configured to extract transactional data based on the plurality of distinct queries and copy the transactional data to a destination system, wherein the transactional data comprises a plurality of data types.

2. The ETL system of claim 1, wherein the data extraction module is configured to:
   copy the transactional data to one or more intermediate systems;
   create a plurality of initial tables based on a number of data types present in the transactional data;
   sort the transactional data into respective tables;
   merge the plurality of tables to form a final table; and
   copy the final table to the destination system.

3. The ETL system of claim 2, wherein the data allocation module is configured to sequence the final table based on the input query.

4. The ETL system of claim 3, wherein the data allocation module is configured to tag each transactional data with a corresponding tenant identifier.

5. The ETL system of claim 1, wherein the query parsing module is further configured to identify the plurality of source machines that store the transactional data from the input query.

6. The ETL system of claim 5, wherein the query parsing module is further configured to identify the number of data types from the input query.

7. The ETL system of claim 6, wherein the query parsing module is further configured to apply an index to each identified data types.

8. The ETL system of claim 1, further comprising a source registry configured to store an initial set of identifiers corresponding to the plurality of source machines.

9. The ETL system of claim 8, wherein the source registry is configured to be modified to add additional set of identifiers or delete a portion of the initial set of identifiers.

10. The ETL system of claim 1, further comprising a monitoring module configured to perform periodic monitoring and identify incremental transactional data present on the plurality of source machines.

11. The ETL system of claim 10, wherein the monitoring module is further configured to trigger an alert to the data extraction module to extract the incremental transactional data from the plurality of source machines.

12. The ETL system of claim 1, wherein the input query is defined using structured query language.

13. The ETL system of claim 2, wherein the plurality of initial tables is stored in the one or more intermediate systems.

14. A method for extracting transactional data from a plurality of source machines, the method comprising:
    defining an input query to extract transactional data, wherein the transactional data is present on a plurality of source machines, and wherein the plurality of source machines form a multi-tenant system and each source machine is identified by a unique tenant identifier;
    parsing the input query to create a tree structure, wherein the tree structure comprises a plurality of distinct queries;
    extracting transactional data based on the plurality of distinct queries; and
    copying the transactional data to a destination system; and wherein the transactional data comprises a plurality of data types.

15. The method of claim 14, wherein the step of extracting comprises:
    copying the transactional data to one or more intermediate systems;
    creating a plurality of initial tables based on a number of data types present in the transactional data;
    indexing the tables based on the data types and link operations identified from the query;
    sorting the transactional data into respective tables;
    merging the plurality of tables to form a final table; and
    copying the final table to the destination system.

16. The method of claim 15, wherein sequencing the final table based on the input query.

17. The method of claim 16, wherein tagging each transactional data with a corresponding tenant identifier.

18. The method of claim 14, further comprising identifying the plurality of source machines that store the transactional data from the input query.

19. The method of claim 18, further comprising identifying the number of data types based on the input query.

20. The method of claim 14, further comprising storing an initial set of identifiers corresponding to the plurality of source machines.

21. The method of claim 20, further comprising modifying the source registry to add additional set of identifiers or delete a portion of the initial set of identifiers.

22. The method of claim 14, further comprising identifying the incremental transactional data present on the plurality of source machines.

23. The method of claim 22, further comprising triggering an alert to the data extraction module to extract the incremental transactional data from the plurality of source machines.

* * * * *